United States Patent
Amano et al.

(10) Patent No.: US 7,627,355 B2
(45) Date of Patent: Dec. 1, 2009

(54) PORTABLE TERMINAL DEVICE

(75) Inventors: Toru Amano, Tokyo (JP); Yoshikazu Iino, Kanagawa (JP); Atsushi Shirata, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 340 days.

(21) Appl. No.: 11/365,520

(22) Filed: Mar. 2, 2006

(65) Prior Publication Data

US 2006/0205450 A1    Sep. 14, 2006

(30) Foreign Application Priority Data

Mar. 7, 2005    (JP) .............................. 2005-062503

(51) Int. Cl.
  *H04M 1/00*    (2006.01)
(52) U.S. Cl. .................................. 455/575.4; 455/575.1
(58) Field of Classification Search .............. 455/575.4, 455/575.1
  See application file for complete search history.

(56) References Cited

U.S. PATENT DOCUMENTS

| 5,335,274 | A  | * | 8/1994 | Masuda et al. ......... 379/433.12 |
| 2001/0009847 | A1 | | 7/2001 | Kim et al. |
| 2005/0064921 | A1 | * | 3/2005 | Jeong et al. .............. 455/575.4 |
| 2005/0079898 | A1 | * | 4/2005 | Park ........................ 455/575.1 |
| 2005/0113154 | A1 | * | 5/2005 | Park et al. ................ 455/575.4 |
| 2005/0255897 | A1 | * | 11/2005 | Lee et al. .................. 455/575.4 |
| 2005/0288077 | A1 | * | 12/2005 | Wu ........................... 455/575.4 |
| 2006/0053847 | A1 | | 3/2006 | Taki et al. |

FOREIGN PATENT DOCUMENTS

| EP | 0 501 820 A2 | 9/1992 |
| EP | 1 148 692 A2 | 10/2001 |
| EP | 1 501 260 A1 | 1/2005 |
| GB | 2 350 516 A | 11/2000 |
| JP | 2003-319042 | 11/2003 |

* cited by examiner

*Primary Examiner*—Lester Kincaid
*Assistant Examiner*—Daniel Lai
(74) *Attorney, Agent, or Firm*—Oblon, Spivak, McClelland, Maier & Neustadt, L.L.P.

(57) ABSTRACT

A cellular phone has an upper casing and a lower casing. The upper casing has a pair of slide grooves defined in a substantially lower half region thereof along respective opposite side faces of said upper casing, and the lower casing has a pair of slide grooves defined in a substantially upper half region thereof along respective opposite side faces of said lower casing. Slide connection members are fastened to the lower casing by screws threaded into respective joint holes in the lower casing through the respective slide grooves of the upper casing, and a bifurcated joint slide connection member and a slide connection member are fastened to a joint bar of the upper casing by screws threaded into respective joint holes in the joint bar through the respective slide grooves of the lower casing. The upper and lower casings are made slidable by the slide connection members, and are stably connected to each other against wobbling movement.

18 Claims, 15 Drawing Sheets

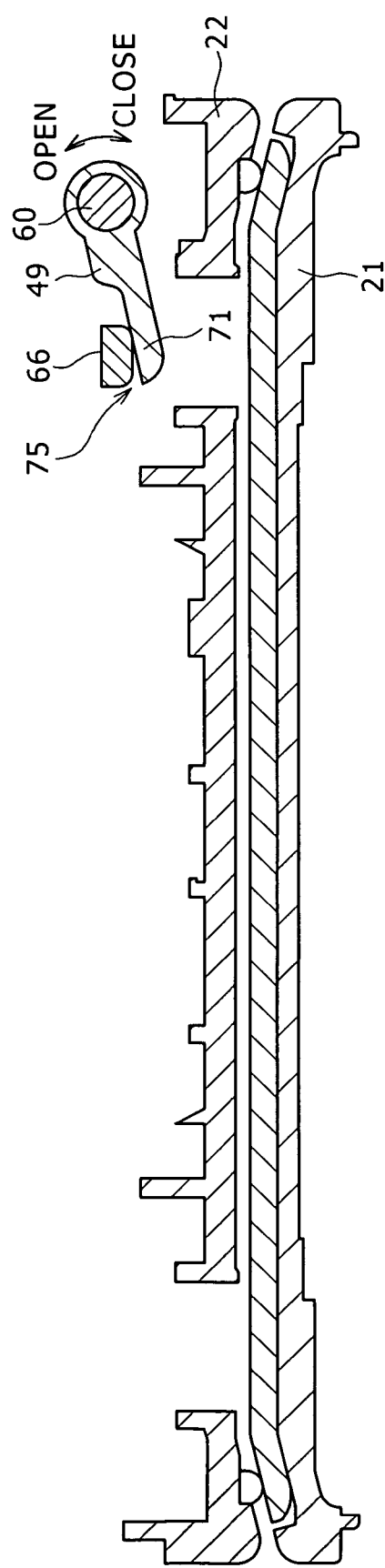

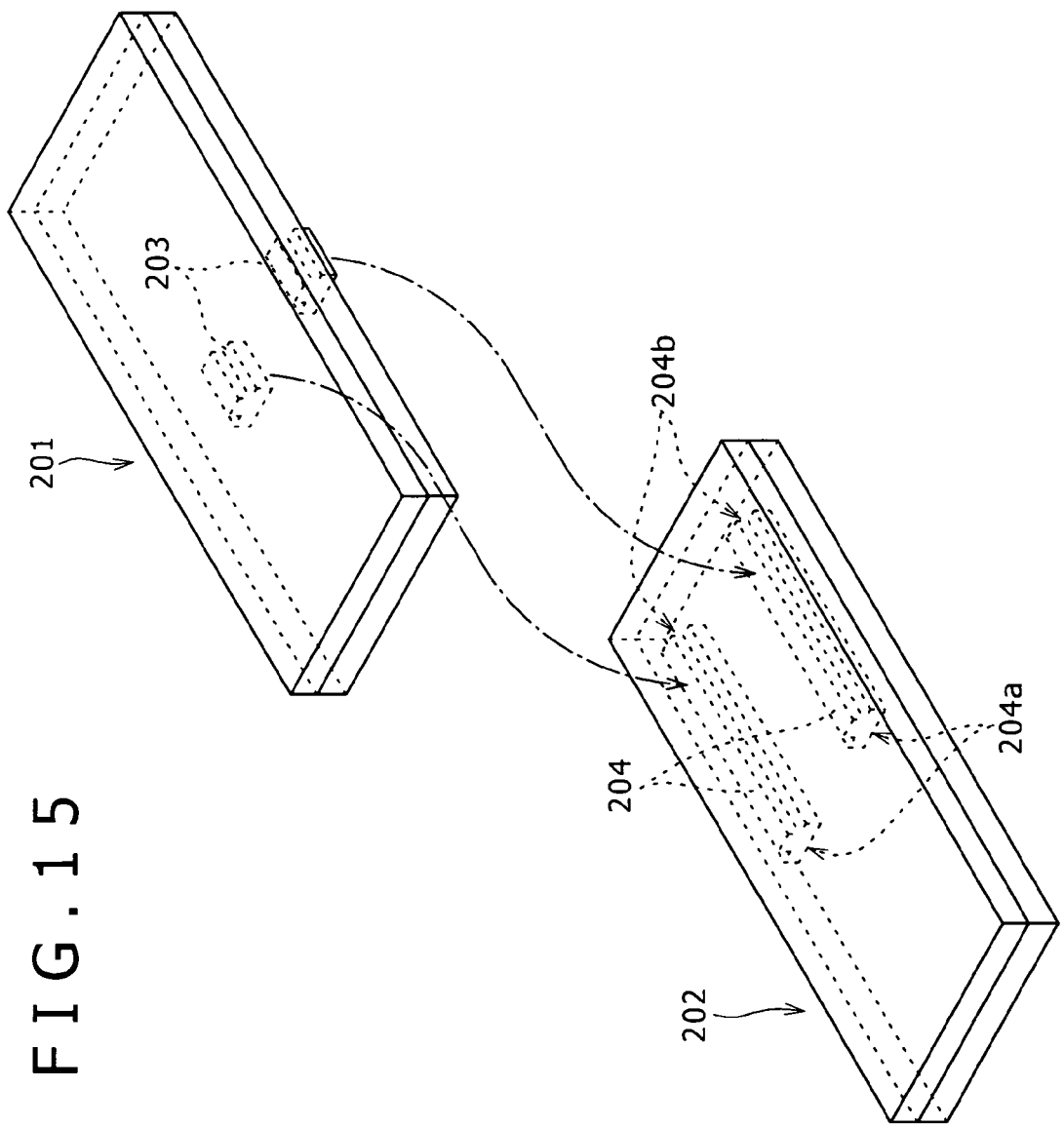

PORTABLE TERMINAL DEVICE

CROSS REFERENCES TO RELATED APPLICATIONS

The present invention contains subject matter related to Japanese Patent Application JP 2005-062503 filed in the Japanese Patent Office on Mar. 7, 2005, the entire contents of which being incorporated herein by reference.

BACKGROUND OF THE INVENTION

The present invention relates to a portable terminal device suitable for use as a cellular phone, a PHS (Personal Handyphone System) phone, a PDA (Personal Digital Assistant) unit, an electronic dictionary unit, a portable navigation unit, or the like.

At present, there is known a slide-type cellular phone having a casing assembly made up of a lower casing and an upper casing that is slidable against the lower casing to open and close the casing assembly. When the upper casing is fully slid against the lower casing to open the casing assembly, slide grooves of a slide mechanism are revealed on the reverse side of the upper casing. The revealed slide grooves make the cellular phone look poor in appearance. In addition, since the slide grooves are in the form of holes, when the upper casing is fully slid against the lower casing to open the casing assembly, dust and dirt particles tend to enter through the slide grooves into the casing assembly.

Japanese Patent Laid-Open No. 2003-319042 discloses a portable terminal device that is designed to eliminate the above drawbacks. As shown in FIG. 15 of the accompanying drawings, the portable terminal device includes a front casing 201 having a pair of teeth 203 of a substantially T-shaped cross section and a rear casing 202 having a pair of guide grooves 204 that are as long as the area in which the front casing 201 and the rear casing 202 face each other.

The teeth 203 on the front casing 201 slidably engage in the respective guide grooves 204 in the rear casing 202. The guide grooves 204 allowing the teeth 203 to slide therealong from ends 204a thereof to other ends 204b thereof.

Since the length of the guide grooves 204 is limited within the area in which the front casing 201 and the rear casing 202 face each other, even when the front casing 201 is fully slid against the rear casing 202 to open the casing assembly, the guide grooves 204 are not exposed out of the area in which the front casing 201 and the rear casing 202 face each other. Therefore, when the casing assembly is opened, the guide grooves 204 are not exposed, so that the portable terminal device does not look poor in appearance and dust and dirt particles do not enter through the guide grooves 204 into the casing assembly.

In the portable terminal device disclosed in Japanese Patent Laid-Open No. 2003-319042, the front casing 201 and the rear casing 202 are operatively connected to each other by the two teeth 203 and the two guide grooves 204. Stated otherwise, the front casing 201 and the rear casing 202 are operatively connected to each other at two positions by the teeth 203 engaging in the guide grooves 204. Accordingly, the strength by which the front casing 201 and the rear casing 202 are connected to each other is relatively weak.

Furthermore, inasmuch as the front casing 201 and the rear casing 202 are supported by the teeth 203 and the guide grooves 204, they tend to wobble vertically when they slide against each other, and may not slide smoothly against each other.

SUMMARY OF THE INVENTION

It is desirable to provide a portable terminal device which includes upper and lower casings that are slidable against each other and are stably supported without wobbling for stable sliding movement.

According to an embodiment of the present invention, there is provided a portable terminal device including: an upper casing; a lower casing; a pair of slide grooves defined in a substantially lower half region of the upper casing closely to respective opposite side faces of the upper casing and extending in a longitudinal direction of the upper casing; a pair of slide grooves defined in a substantially upper half region of the upper casing closely to respective opposite side faces of the lower casing and extending in a longitudinal direction of the lower casing; a pair of joint holes which are defined in the upper casing near respective lower ends of the slide grooves defined in the lower casing and visible through the slide grooves defined in the lower casing when respective confronting faces of the upper casing and the lower casing are superposed on each other; a pair of joint holes which are defined in the lower casing near respective upper ends of the slide grooves defined in the upper casing and visible through the slide grooves defined in the upper casing when the respective confronting faces of the upper casing and the lower casing are superposed on each other; a pair of upper casing slide connection members slidably engaging in the slide grooves defined in the upper casing; and a pair of lower casing slide connection members slidably engaging in the slide grooves defined in the lower casing.

The upper casing and the lower casing are slidably connected to each other by securing the upper casing slide connection members slidably engaging in the slide grooves defined in the upper casing, in the joint holes in the lower casing, and by securing the lower casing slide connection members slidably engaging in the slide grooves defined in the lower casing, in the joint holes in the upper casing, with the respective confronting faces of the upper casing and the lower casing being superposed on each other.

Since the portable terminal device has two pairs of slide shaft structures in which the casings are connected to each other by the upper casing slide connection members slidably engaging in the slide grooves defined in the upper casing, and the casings are connected to each other by the lower casing slide connection members slidably engaging in the slide grooves defined in the lower casing, the casings are slidably connected firmly to each other.

The slide grooves of the upper casing are defined in the substantially lower half region of the upper casing, and the slide grooves of the lower casing are defined in the substantially upper half region of the lower casing. When the personal terminal device is closed with the upper and lower casings being superposed on each other in their entirety, the slide grooves of the upper casing are covered with the lower casing, the slide grooves of the lower casing are covered with the upper casing. When the personal terminal device is closed, therefore, the slide grooves of the casings are concealed from external view. When the personal terminal device is open, a region of the upper casing which is free of the slide grooves projects from the lower casing, the slide grooves of the upper casing are covered with the region having the slide grooves of the lower casing, and the slide grooves of the lower casing are covered with the region having the slide grooves of the upper casing. Therefore, when the personal terminal device is open, the slide grooves of the casings are also concealed from external view.

According to the present invention, the upper casing is of a shape curved so as to concave toward a surface thereof which is opposite to the confronting surface thereof facing the lower casing, and the lower casing is of a shape curved so as to concave toward the confronting surface thereof facing the upper casing. If the upper casing has a display panel thereon, then when the personal terminal device is opened, the display panel on the upper panel is pushed slightly to the front along the curved shape to allow the user to see the display panel with better visibility.

According to the present invention, furthermore, a guide shaft is mounted in the lower casing and has a joint rotatable about the axis of the guide shaft. When the lower casing slide connection members move along the curved lower casing, the joint of the guide shaft which is connected to one of the lower casing slide connection members is turned about the axis of the guide shaft, thereby taking up the difference between a path in which the lower casing slide connection members move along the curved lower casing and a path in which the joint of the guide shaft connected to the one of the lower casing slide connection members moves straight.

The portable terminal device according to the present invention further includes a sliding force reducing section for reducing a sliding force applied to the upper casing through the joint of the guide shaft and the joint of the one of the lower casing slide connection members when the spring of the guide shaft is extended and contracted. Mainly when the portable terminal device is opened, the sliding force that is transmitted through the joint of the guide shaft and a joint of the lower casing slide connection member to the upper casing is reduced by the sliding force reducing section. Therefore, the upper casing and the lower casing are slid against each other at a moderate speed.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 14 is an enlarged transverse cross-sectional view showing the manner in which the bifurcated joint of the guide shaft and the bifurcated joint slide connection member operate when the cellular phone is open; and FIG. 15 is a perspective view of a conventional slide-type cellular phone.

DETAILED DESCRIPTION OF THE PREFERRED EMBODIMENT

A portable terminal device according to the present invention is applicable to any one of cellular phones according to various systems including, for example, PDC (Personal Digital Cellular), CDMA (Code Division Multiple Access), W-CDMA (Wideband-Code Division Multiple Access), GSM (Global System for Mobile communications), etc.

Figure 1:
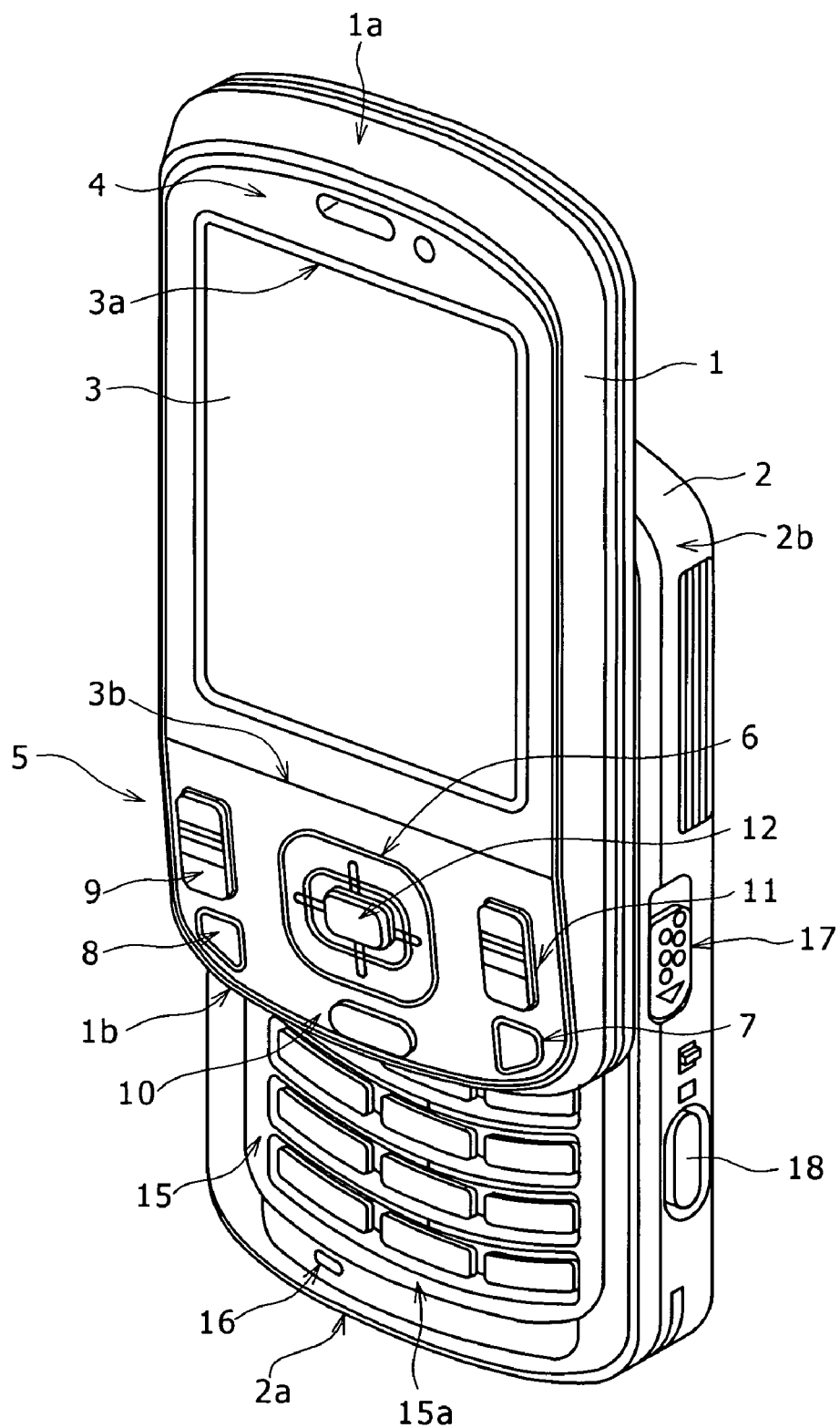
FIG. 1 is a perspective view of a cellular phone according to an embodiment of the present invention, showing the cellular phone as it is open.
Figure 2:
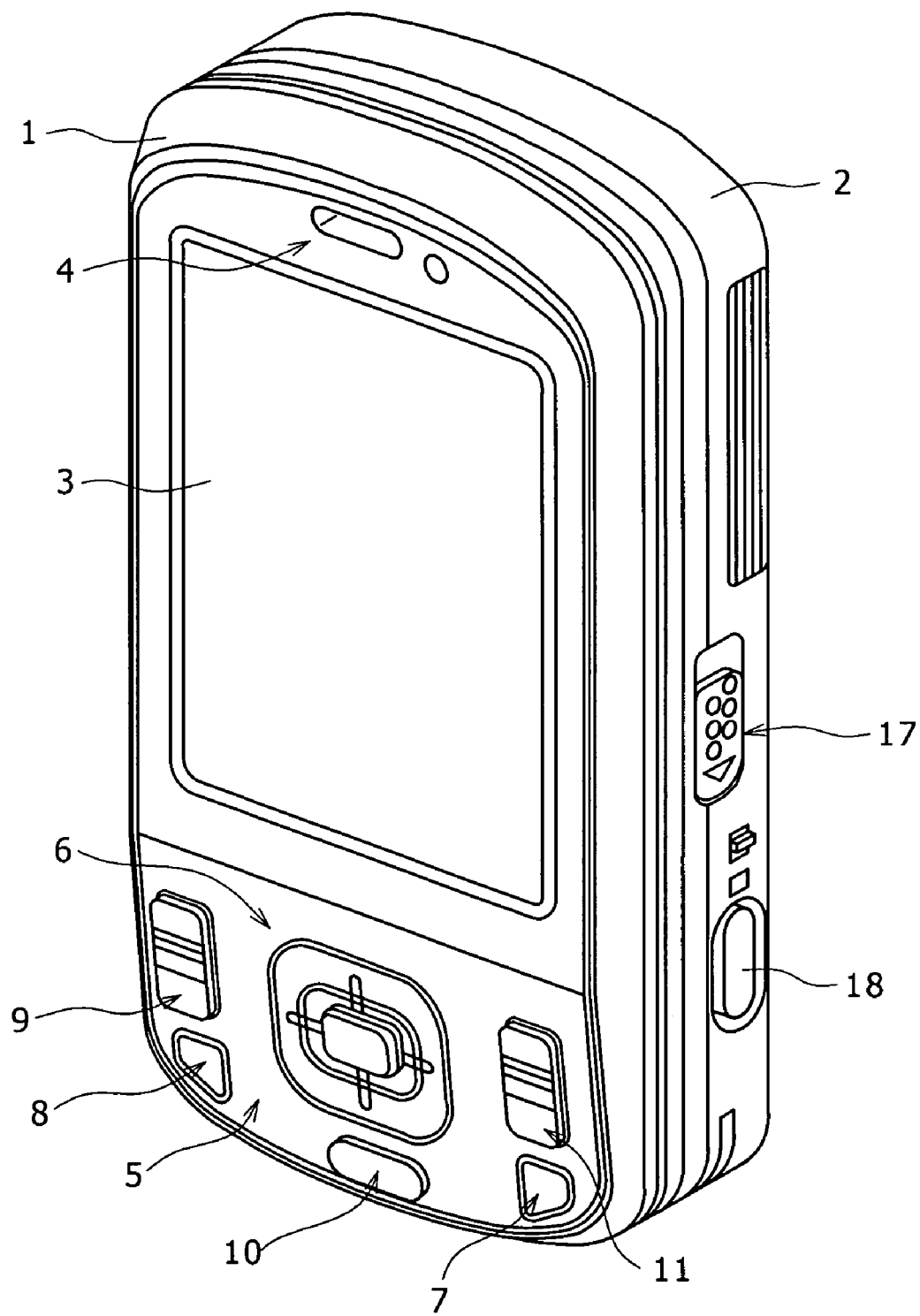
FIG. 2 is a perspective view showing the cellular phone as it is closed.

Structural Details of Cellular Phone:

As shown in FIGS. 1 and 2, a cellular phone according to an embodiment of the present invention includes a slide-type cellular phone including a casing assembly made up of an upper casing 1 and a lower casing 2 which are slidable against each other in the longitudinal direction of the casing assembly. FIG. 1 shows the cellular phone as it is open, and FIG. 2 shows the cellular phone as it is closed.

The upper casing 1 has a display panel 3 on its face side. A speaker 4 is disposed on the face side of the upper casing 1 between an upper end 3a of the display panel 3 and an upper end 1a of the upper casing 1. An upper casing control pad 5 is also disposed on the face side of the upper casing 1 between a lower end 3b of the display panel 3 and a lower end 1b of the upper casing 1.

The upper casing control pad 5 includes a criss-cross key 6 having an enter key 12 at the center, an on-hook key 7, an off-hook key 8, a mail key 9, a clear key 10, and a network connection key 11. The upper casing control pad 5 allows the user to send and receive a call, make and browse mail messages, and browse Web pages while the cellular phone is being closed as shown in FIG. 2.

As shown in FIG. 1, the lower casing 2 has on its face side a lower casing control pad 15 which is exposed when the cellular phone is opened. The lower casing control pad 15 includes ten numeral keys from 0 to 9 keys and symbol keys including # and * keys.

The lower casing 2 also has a microphone 16 disposed on its face side between a lower end 2a of the lower casing 2 and a lower end 15a of the lower casing control pad 15. The lower casing 2 has, on a right side face 2b thereof, an opening and closing lever 17 to be slid for opening the cellular phone and a shutter button 18 for performing a camera function.

Figure 3:
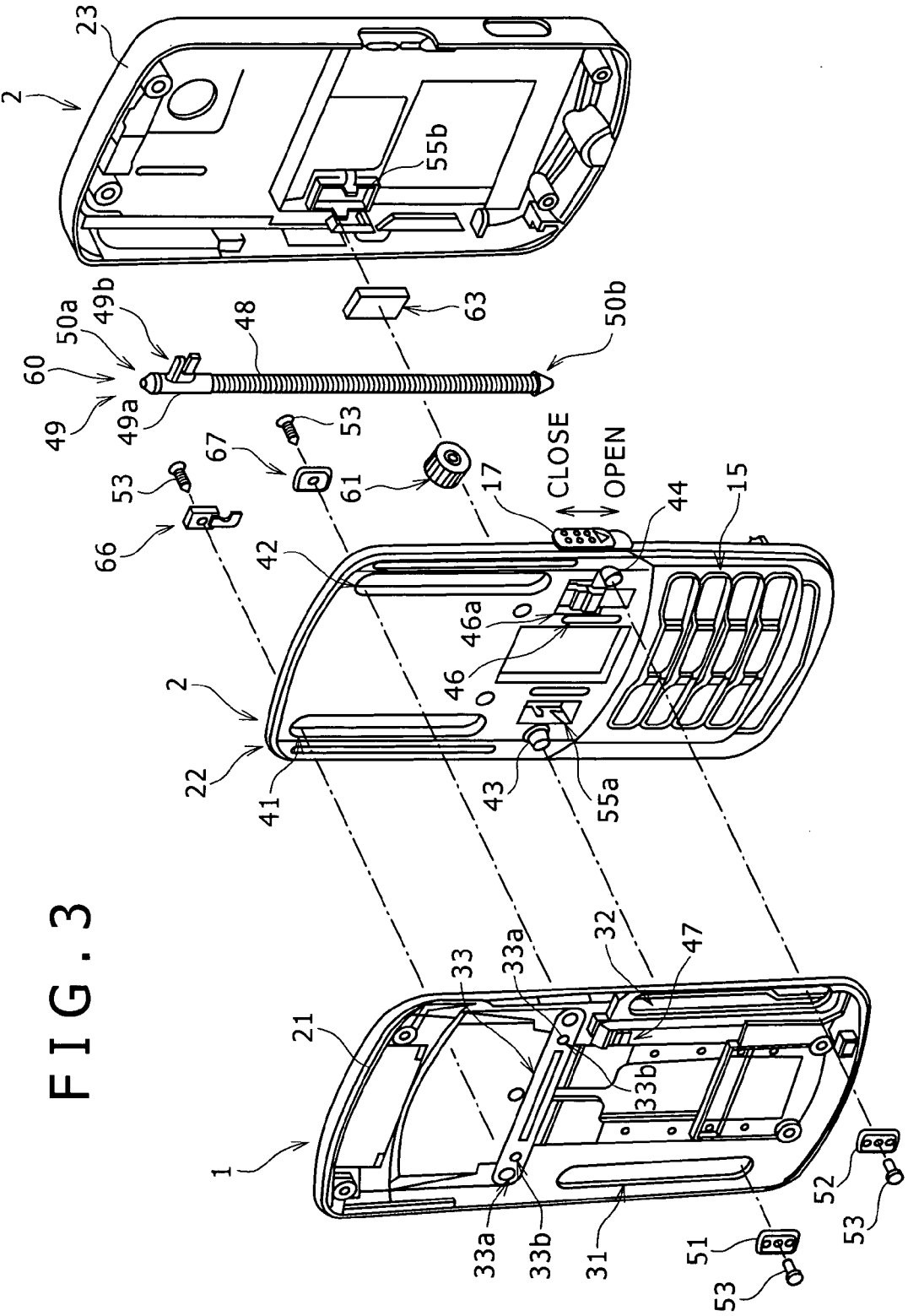
FIG. 3 is an exploded perspective view of some parts of a casing assembly of the cellular phone.

FIG. 3 shows some parts of the casing assembly of the cellular phone in exploded perspective. Specifically, FIG. 3 shows a first casing member 21 which is a lower casing member of the upper casing 1 that is held against the lower casing 2, a second casing member 22 which is an upper casing member of the lower casing 2 that is held against the upper casing 1, and a third casing member 23 which is a lower casing member of the lower casing 2.

As shown in FIG. 3, the first casing member 21 has a pair of slide grooves 31, 32 which have a length smaller than one-half the full length of the first casing member 21. The slide grooves 31, 32 are defined in a substantially lower half region of the first casing member 21, and are disposed close to and extend along respective opposite side faces of the first casing member 21.

The first casing member 21 has a joint bar 33 disposed on a portion thereof above a substantially central region of the first casing member 21 and extending transversely across the first casing member 21. The joint bar 33 is fastened to the first casing member 21 by joint pins 33a screwed to the joint bar 33 near its opposite ends. The joint bar 33 has joint holes 33b defined therein adjacent to the respective joint pins 33a. The first casing member 21 is slidably connected to the second casing member 22 through the joint holes 33b.

The second casing member 22, which is held against the first casing member 21, also has a pair of slide grooves 41, 42 which have a length smaller than one-half the full length of the second casing member 22. Unlike the slide grooves 31, 32 defined in the substantially lower half region of the first casing member 21, the slide grooves 41, 42 are defined in a substantially upper half region of the second casing member 22, and are disposed close to and extend along respective opposite side faces of the second casing member 22.

The second casing member 22 has a pair of joint holes 43, 44 defined in respective opposite sides of a substantially central region of the second casing member 22. Slide connection members 51, 52, to be described later, are fastened to the second casing member 22 by screws 53 threaded into respective joint holes 43, 44 through the respective slide grooves 31, 32, thereby slidably connecting the first casing member 21 and the second casing member 22 to each other.

The opening and closing lever 17 is disposed substantially centrally on the right side face of the second casing member 22. The opening and closing lever 17 is normally biased by a helical spring to move in a closing direction indicated by the arrow in FIG. 3. A lock mechanism 46 disposed in the second casing member 22 is operatively linked to the opening and closing lever 17. Specifically, when the cellular phone is closed, the lock mechanism 46 has a lock finger 46a engaging in a hole 47 defined in the first casing member 21 to keep the cellular phone closed. When the user slides the opening and closing lever 17 in an opening direction indicated by the arrow, the lock finger 46a of the lock mechanism 46 disengages from the hole 47, allowing the upper casing 1 to slide against the lower casing 2 in a direction to expose the lower casing control pad 15 on the lower casing 2 under the bias of a helical spring 48 of a guide shaft 60 to be described later.

The second casing member 22 and the third casing member 23 have respective pinion placement members 55a, 55b defined respectively therein adjacent to the lock mechanism 46. When the second casing member 22 and the third casing member 23 are connected to each other, the pinion placement members 55a, 55b are held against each other in confronting relation to each other to jointly make up a box-shaped pinion placement unit.

A pinion 61 is rotatably held in the pinion placement unit for rotation in a plane along the longitudinal direction of the second casing member 22. The pinion placement unit accommodates therein a rotational speed reducer 63 in combination with the pinion 61. The rotational speed reducer 63 serves as a damper held against the pinion 61 at all times for reducing the rotational speed of the pinion 61.

Figure 4:
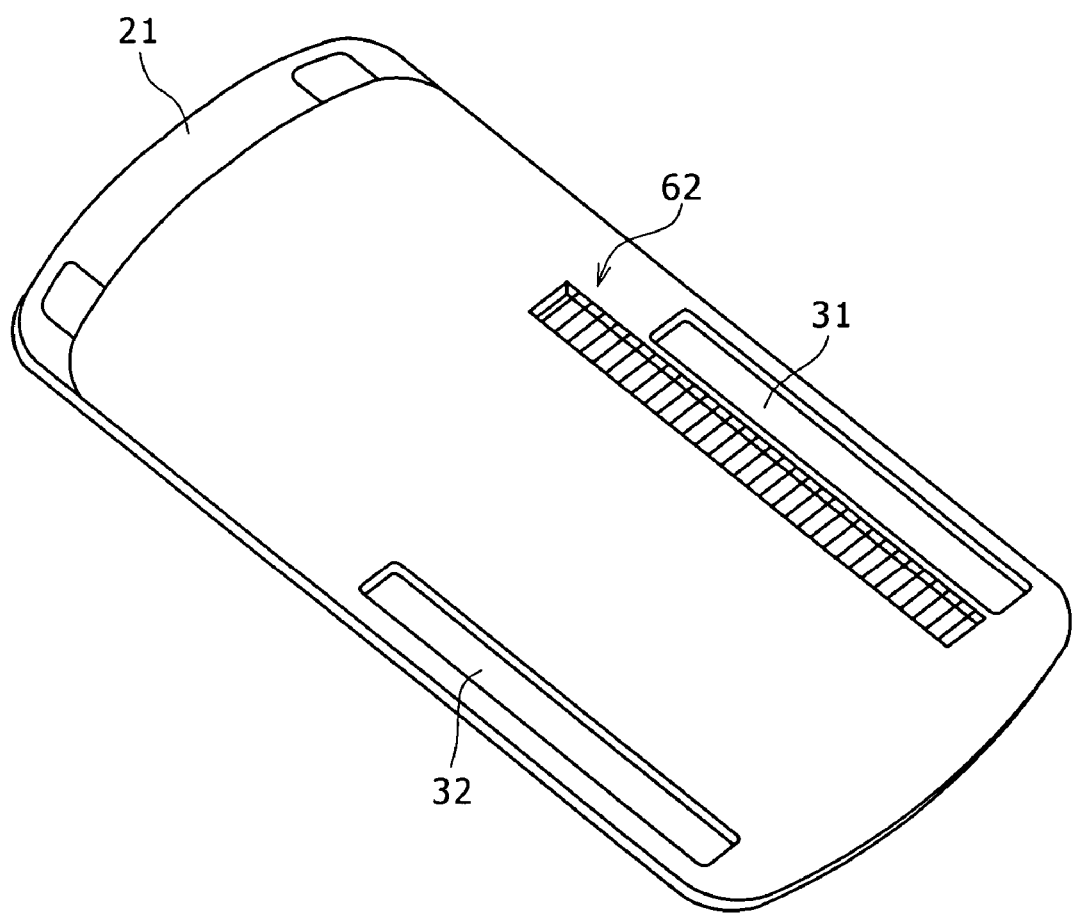
FIG. 4 is a perspective view showing a rack on an upper casing for meshing with a pinion on a lower casing of the cellular phone.

FIG. 4 shows in perspective the first casing member 21 as viewed from its side held against the second casing member 22. As shown in FIG. 4, the first casing member 21 has a rack 62 disposed adjacent to the slide groove 31, and the rack 62 is slightly longer than the slide groove 31. When the second casing member 22 and the third casing member 23 are connected to each other, the pinion 61 placed in the pinion placement unit is held in mesh with the rack 62. Rotary motion of the pinion 62 is converted by the rack 62 to linear motion, which is transmitted to the first casing member 21.

The guide shaft 60 serves to apply a force tending to cause the upper casing 1 and the lower casing 2 to slide against each other. The guide shaft 60 has an overall length slightly smaller than the full length of the lower casing 2. The guide shaft 60 includes a straight rod-shaped shaft body, an annular helical spring 48 and a bifurcated joint 49 which are fitted over the straight rod-shaped shaft body, a tip end retainer 50a mounted on the tip end of the shaft body, and a rear end retainer 50b mounted on the rear end of the shaft body.

The bifurcated joint 49 has an annular sleeve 49a having a length which is about one-sixth of the full length of the guide shaft 60, and a bifurcated member 49b projecting from the annular sleeve 49a in a direction perpendicular to the longitudinal direction of the annular sleeve 49a. The bifurcated joint 49 is movable along the guide shaft 60 as the helical spring 48 is extended or contracted, and is rotatable around the axis of the guide shaft 60.

As described later, the guide shaft 60 engages a bifurcated engagement slide connection member 66 through the bifurcated member 49b for transmitting the sliding force from the helical spring 48 through the bifurcated engagement slide connection member 66 to the upper casing 1.

[Assembling of the Casing Assembly]

Two Pairs of Slide Shaft Structures:

For assembling the upper casing 1 and the lower casing 2 together, the joint holes 43, 44 of the second casing member 22 are placed respectively in the slide grooves 31, 32 of the first casing member 21, and the slide connection members 51, 52 are fastened to the second casing member 22 by the screws 53 threaded into the respective joint holes 43, 44 from the side of the first casing member 21. The slide connection members 51, 52 are of a width which is slightly greater than the width of the slide grooves 31, 32.

With the slide connection members 51, 52 being thus screwed to the respective joint holes 43, 44 of the second casing member 22 through the slide grooves 31, 32, the first casing member 21 are slidably connected to the second casing member 22 while the slide connection members 51, 52 are engaging in the slide grooves 31, 32.

After the first casing member 21 and the second casing member 22 have been connected to each other, the joint holes 33b of the joint bar 33 of the first casing member 21 are visible through the slide grooves 41, 42 of the second casing member 22. The bifurcated engagement slide connection member 66 is fastened to one of the joint holes 33b by a screw 53 through the slide groove 41, and a slide connection member 67 is fastened to the other joint hole 33b by a screw 53 through the slide groove 42.

The bifurcated engagement slide connection member 66 and the slide connection member 67 have a width slightly greater than the width of the slide grooves 41, 42. With the bifurcated engagement slide connection member 66 and the slide connection member 67 being thus screwed to the respective joint holes 33b of the first casing member 21 through the slide grooves 41, 42, the first casing member 21 is slidably connected to the second casing member 22 while the bifurcated engagement slide connection member 66 and the slide connection member 67 are engaging in the slide grooves 41, 42.

In the cellular phone according to the present embodiment, therefore, the first casing member 21 is connected to the second casing member 22 by the slide connection members 51, 52, and the second casing member 22 is connected to the first casing member 21 by the bifurcated engagement slide connection member 66 and the slide connection member 67. Stated otherwise, the first casing member 21 and the second casing member 22 are connected to each other by two pairs of slide shaft structures. Therefore, the first casing member 21 and the second casing member 22 are firmly connected to each other while they are being slidable against each other.

Assembling of the Guide Shaft:

Then, the bifurcated joint 49 of the guide shaft 60 is brought into engagement with the bifurcated engagement slide connection member 66, and the guide shaft 60 is assembled into the second casing member 22.

Figure 5A:
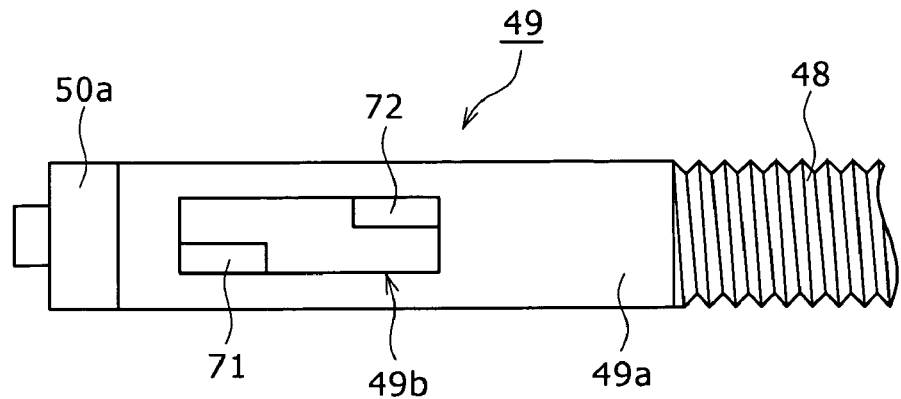
FIGS. 5A and 5B are enlarged fragmentary views of a guide shaft on the lower casing of the cellular phone.
Figure 5B:
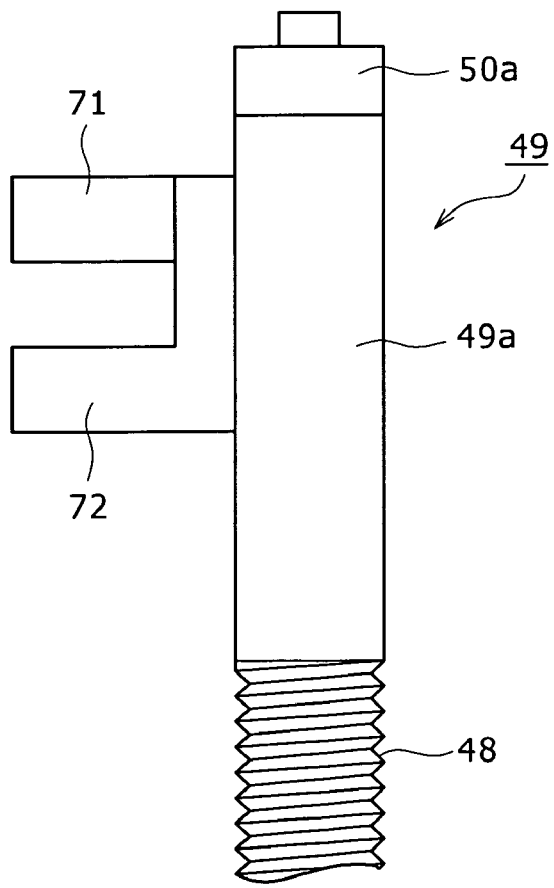

FIG. 5A is an enlarged fragmentary side elevational view of the bifurcated joint 49 of the guide shaft 60, and FIG. 5B is an enlarged fragmentary plan view of the bifurcated joint 49 of the guide shaft 60. As shown in FIGS. 5A and 5B, the bifurcated member 49b has an insertion pin 71 and a riding pin 72 which are positioned in staggered relation to each other.

Figure 6A:
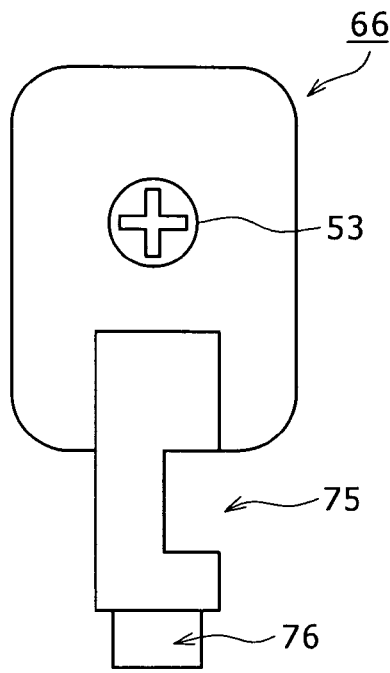
FIGS. 6A, 6B, and 6C are enlarged views of a bifurcated joint slide connection member for engaging a bifurcated joint of the guide shaft.
Figure 6B:
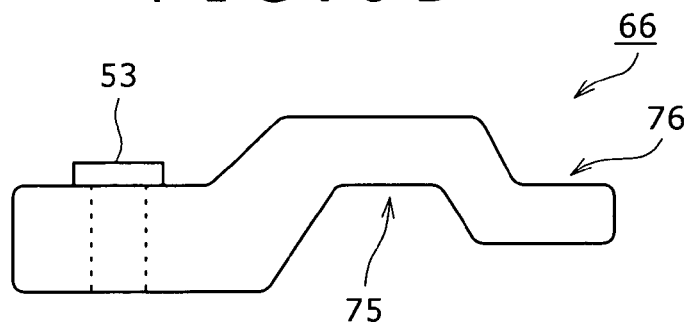
Figure 6C:
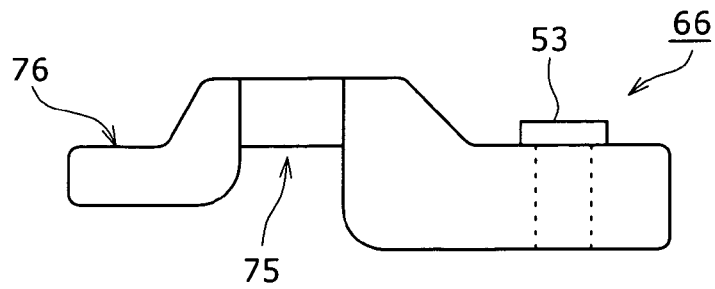

FIG. 6A is an enlarged plan view of the bifurcated engagement slide connection member 66, FIG. 6B is an enlarged right side elevational view of the bifurcated engagement slide connection member 66, and FIG. 6C is an enlarged left side elevational view of the bifurcated engagement slide connection member 66. As shown in FIGS. 6A through 6C, the bifurcated engagement slide connection member 66 has a pin insert 75 into which the insertion pin 71 of the bifurcated member 49b is to be inserted and a mount ledge 76 on which the riding pin 72 of the bifurcated member 49b is to ride.

Figure 7:
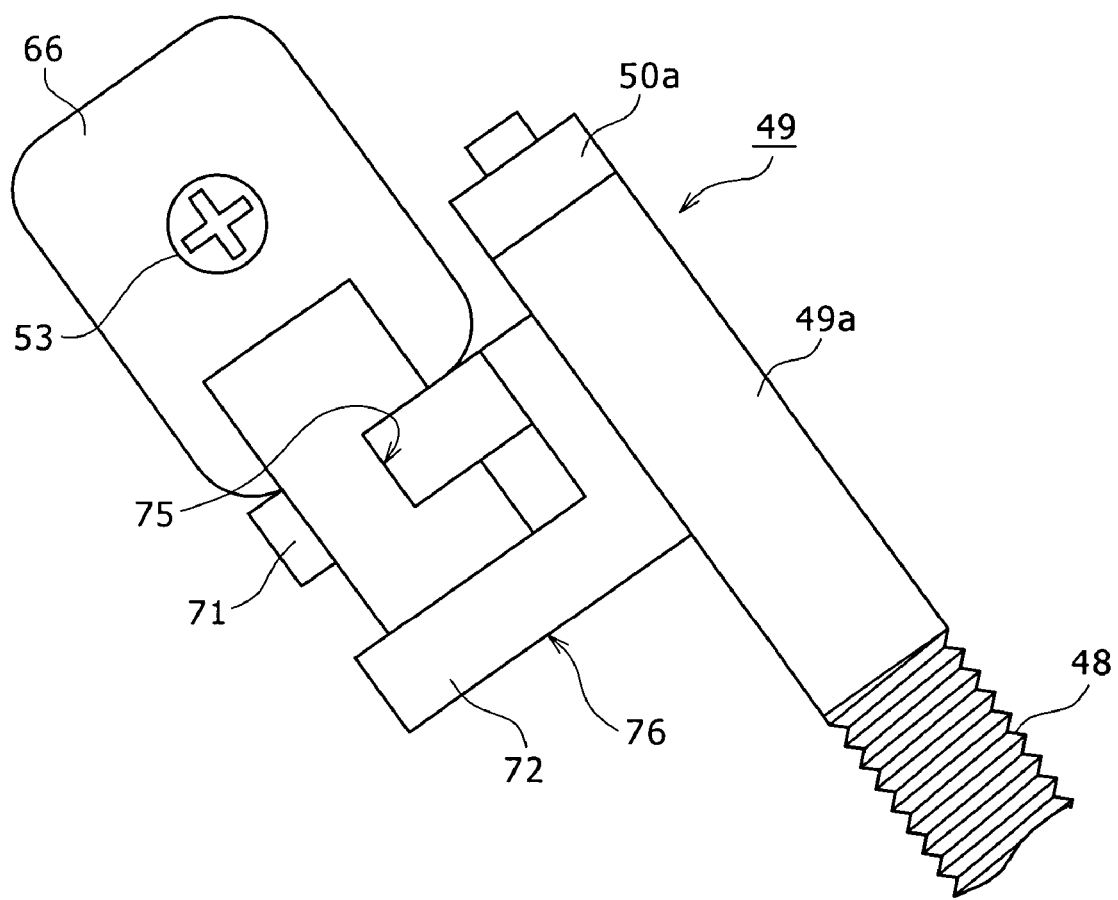
FIG. 7 is an enlarged view showing the manner in which the bifurcated joint of the guide shaft and the bifurcated joint slide connection member engage with each other.

FIG. 7 shows in perspective the manner in which the bifurcated joint 49 of the guide shaft 60 and the bifurcated engagement slide connection member 66 engage each other. As shown in FIG. 7, for joining the bifurcated engagement slide connection member 66 and the bifurcated joint 49 to each other, the insertion pin 71 of the bifurcated member 49b is inserted into the pin insert 75 of the bifurcated engagement slide connection member 66. At the same time that the insertion pin 71 is inserted into the pin insert 75, the riding pin 72 of the bifurcated member 49b rides onto the mount ledge 76 of the bifurcated engagement slide connection member 66. In this manner, the guide shaft 60 is joined to the bifurcated engagement slide connection member 66.

Figure 8:
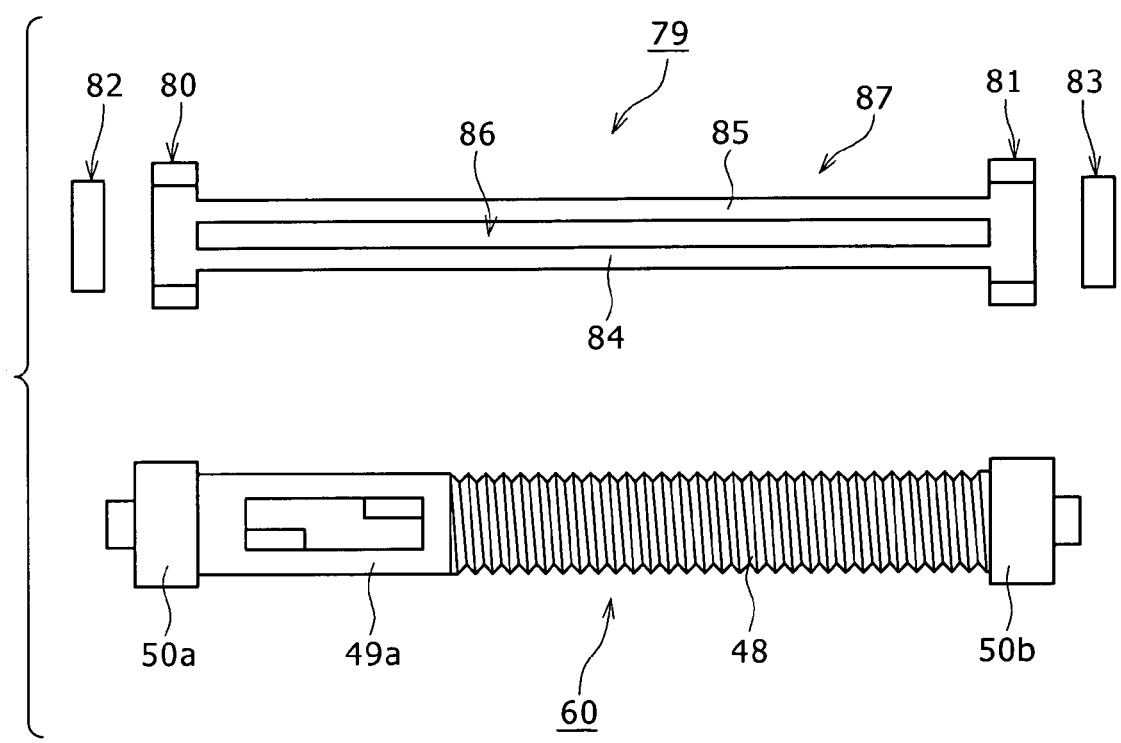
FIG. 8 is a view of a guide shaft placement member on the lower casing of the portable terminal device.

With the bifurcated joint 49 thus engaging the bifurcated engagement slide connection member 66, the guide shaft 60 is placed on and fixed to a guide shaft placement member 79 on the second casing member 22 shown in FIG. 8.

FIG. 8 shows in plan the guide shaft placement member 79. As shown in FIG. 8, the guide shaft placement member 79 has a tip end grip 80 for gripping the tip end retainer 50a of the guide shaft 60 and a rear end grip 81 for gripping the rear end retainer 50b of the guide shaft 60.

The guide shaft placement member 79 also has stoppers 82, 83 for abutting against the tip end of the tip end retainer 50a and the rear end of the rear end retainer 50b, respectively, to prevent the guide shaft 60 from being moved, i.e., displaced, in the longitudinal direction of the second casing member 22.

The guide shaft placement member 79 has a rail support 87 for supporting the guide shaft 60 placed thereon. The rail support 87 has a groove 86 defined between a pair of transversely spaced rails 84, 85 extending between and interconnecting the tip end grip 80 and the rear end grip 81.

The guide shaft 60 is placed on the guide shaft placement member 79 when the guide shaft 60 is pushed against the guide shaft placement member 79 in the direction normal to the sheet of FIG. 8. When the guide shaft 60 is placed on the guide shaft placement member 79, the guide shaft 60 is supported in its entirety on the rail support 87. The tip end retainer 50a is gripped by the tip end grip 80 and the rear end retainer 50b is gripped by the rear end grip 81. The tip end of the tip end retainer 50a is held against the stopper 82, and the rear end of the rear end retainer 50b is held against the stopper 83. In this manner, the guide shaft 60 is placed without wobbling on the guide shaft placement member 79.

Figure 9:
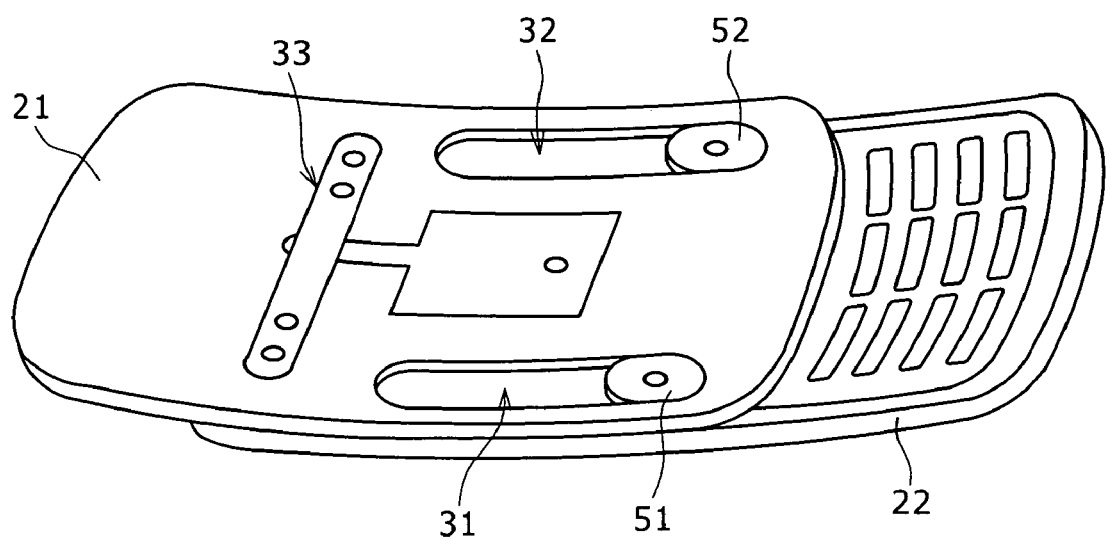
FIG. 9 is a perspective view showing how the casing assembly of the portable terminal device is curved.

As shown in FIG. 9, the cellular phone according to the present embodiment has the casing members 21, 22 gradually curved in their entirety so as to be concave upwardly (toward the display panel 3). When the cellular phone is opened, the display panel 3 on the upper casing 1 is pushed slightly to the front along the curved shape to allow the user to see the display panel 3 with better visibility. However, the guide shaft 60 is shaped like a straight rod.

Figure 10:
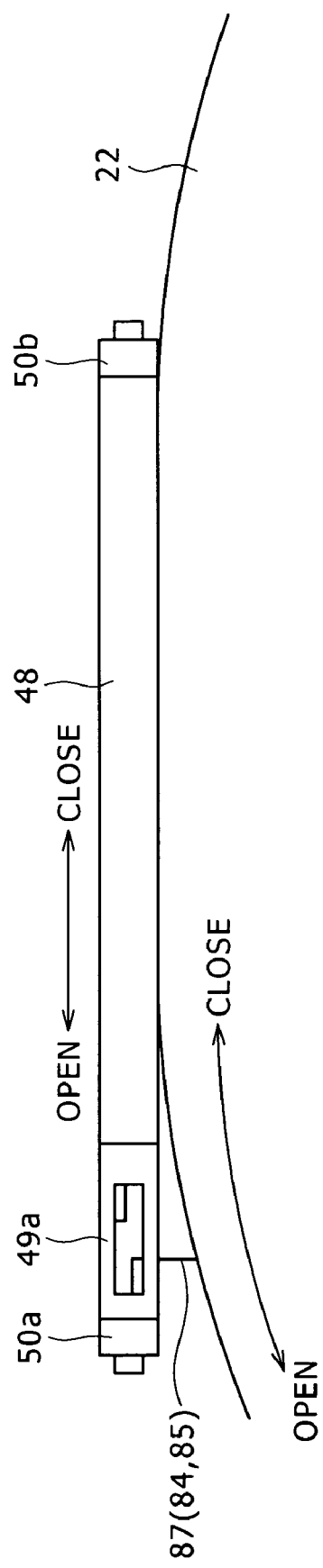
FIG. 10 is a view illustrative of the relationship between the curve of the casing assembly and the guide shaft which extends straight.

As shown in FIG. 10, the rail support 87 of the guide shaft placement member 79 is tapered to make up for a space between the straight rod-shaped guide shaft 60 and the curved second casing member 22 at the time the straight rod-shaped guide shaft 60 is placed on the curved second casing member 22. Therefore, the straight rod-shaped guide shaft 60 is stably placed in position on the gradually curved second casing member 22.

Assembling of the Pinion and the Rotational Speed Reducer:

Then, the pinion 61 and the rotational speed reducer 63 are assembled into the pinion placement unit. Specifically, when the second casing member 22 and the third casing member 23 are connected to each other, the pinion placement member 55a of the second casing member 22 and the pinion placement member 55b of the third casing member 23 jointly make up the pinion placement unit.

After the pinion 61 is placed in the pinion placement member 55a of the second casing member 22, and the rotational speed reducer 63 is placed in the pinion placement member 55b of the third casing member 23, the second casing member 22 and the third casing member 23 are connected to each other.

The pinion 61 is placed in the box-shaped pinion placement unit while being held in mesh with the rack 62 on the first casing member 21 shown in FIG. 4 and held against the rotational speed reducer 63 on the pinion placement member 55b at all times.

Finally, the casing member with the display panel 3 mounted thereon as shown in FIG. 1 is joined to the first casing member 21. The cellular phone according to the present embodiment, which is slidable into the open and closed positions shown in FIGS. 1 and 2, is now assembled.

[Sliding Movement to Open and Close the Cellular Phone]

Figure 11:
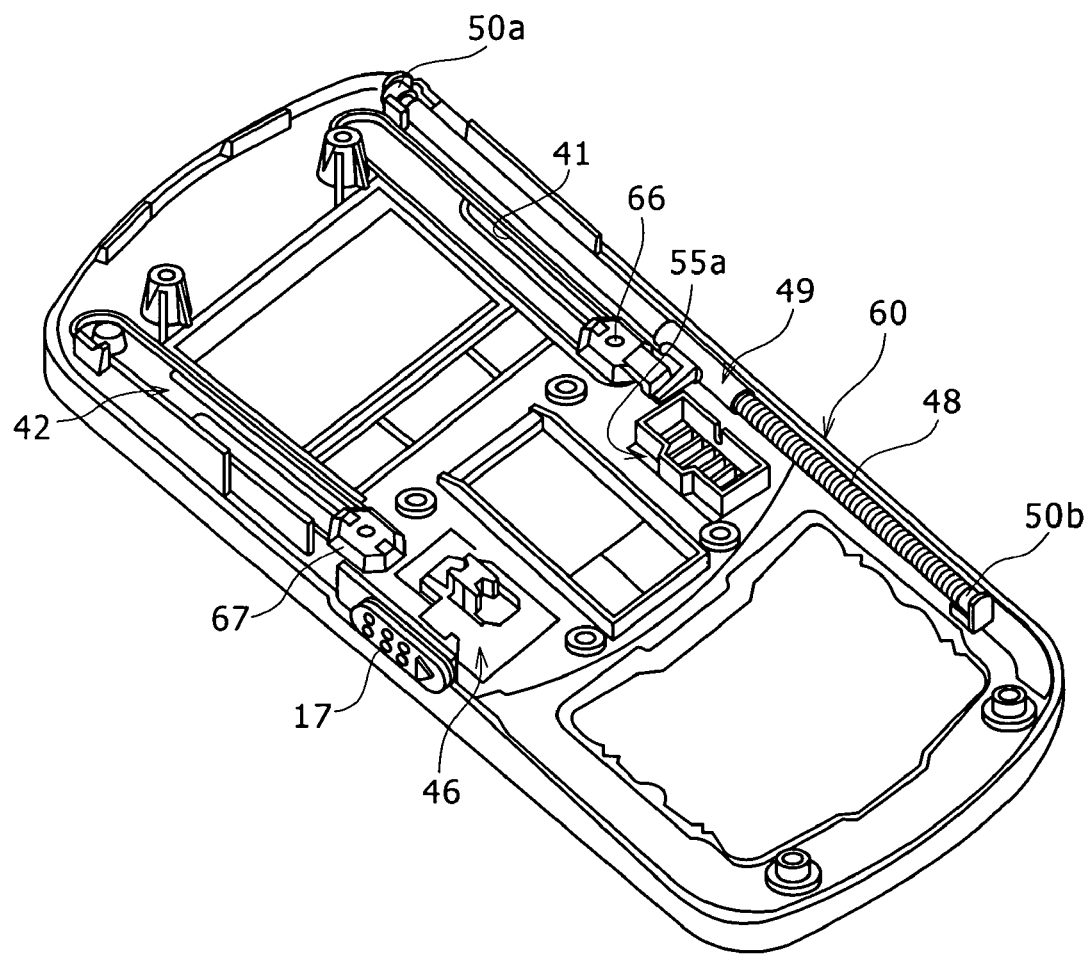
FIG. 11 is a perspective view showing some parts of the cellular phone as it is closed.
Figure 12:
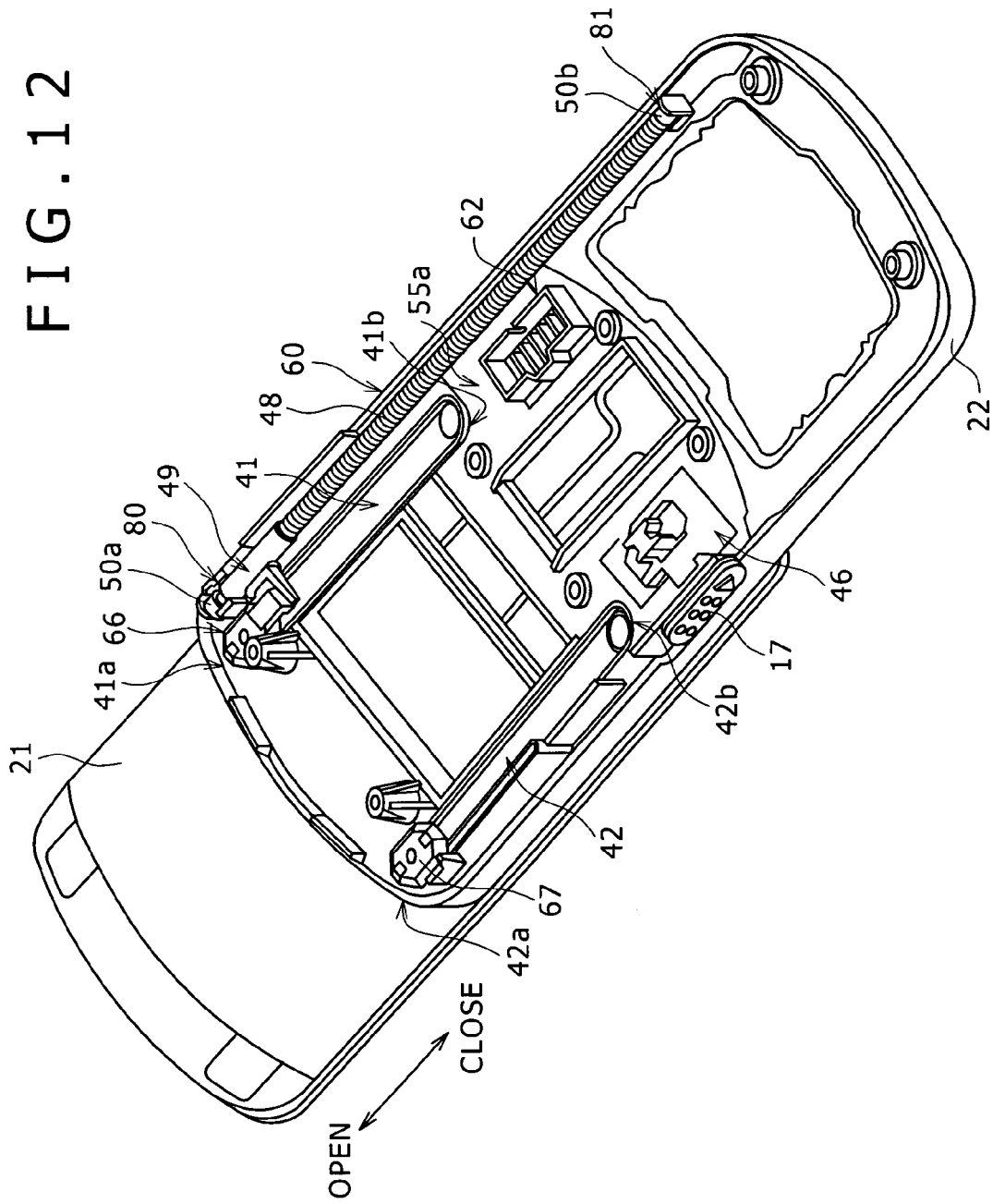
FIG. 12 is a perspective view showing some parts of the cellular phone as it is open.

Sliding movement of some parts to open and close the cellular phone according to the present embodiment will be described below. FIGS. 11 and 12 show in perspective the first casing member 21 and the second casing member 22 with the guide shaft 60 assembled therein, as viewed from the side of the second casing member 22. FIG. 11 shows the cellular phone as it is closed, and FIG. 12 shows the cellular phone as it is open.

Sliding Movement to Close the Cellular Phone:

For closing the cellular phone, i.e., for superposing the first casing member 21 and the second casing member 22 on each other, the user slides the first casing member 21 in the closing direction indicated by the arrow in FIG. 12 from the open position in which the first casing member 21 and the second casing member 22 are displaced away from each other as shown in FIG. 12.

In the open position, as shown in FIG. 12, the bifurcated engagement slide connection member 66 and the slide connection member 67 are held respectively against ends 41a, 42a of the slide grooves 41, 42 of the second casing member 22. When the first casing member 21 is slid in the closing direction, the bifurcated engagement slide connection member 66 and the slide connection member 67 are also slide in the closing direction along the respective slide grooves 41, 42.

Since the cellular phone according to the present embodiment has the two pairs of slide shaft structures as described above, when the bifurcated engagement slide connection member 66 and the slide connection member 67 are slid along the respective slide grooves 41, 42, the slide connection members 51, 52 are also slid respectively along the slide grooves 31, 32 of the first casing member 21.

The bifurcated engagement slide connection member 66 is connected to the bifurcated joint 49 of the guide shaft 60. Consequently, when the bifurcated engagement slide connection member 66 is slid, the bifurcated joint 49 is also slid in the closing direction, while compressing the helical spring 48.

As the user slides the first casing member 21 further in the closing direction, the bifurcated engagement slide connection member 66 and the slide connection member 67 are brought into abutment against respective other ends 41b, 42b of the slide grooves 41, 42 of the second casing member 22, as shown in FIG. 11. At the same time, the lock finger 46a (see FIG. 3) of the lock mechanism 46 engages in the hole 47 in the first casing member 21. The first casing member 21 and the second casing member 22 are now substantially superposed in their entirety as shown in FIG. 11. The cellular phone is in the closed position with the helical spring 48 being maximally compressed by the bifurcated joint 49, stopping the sliding movement of the first casing member 21.

Sliding Movement to Open the Cellular Phone:

For opening the cellular phone, i.e., for displacing the first casing member 21 and the second casing member 22 away from each other, the user slides the opening and closing lever 17 in the opening direction indicated by the arrow in FIG. 12 from the closed position in which the first casing member 21 and the second casing member 22 are superposed on each other as shown in FIG. 11.

When the opening and closing lever 17 is slid in the opening direction, the lock finger 46a of the lock mechanism 46 disengages from the hole 47 in the first casing member 21 in ganged relation to the opening and closing lever 17.

Since the helical spring 48 has been maximally compressed by the bifurcated joint 49 of the guide shaft 60 when the cellular phone has been closed, i.e., when the first casing member 21 and the second casing member 22 have been superposed on each other, the disengagement of the lock finger 46a from the hole 47 allows the helical spring 48 to be extended under its own stored energy. When the helical spring 48 is extended, the bifurcated engagement slide connection member 66 connected to the bifurcated joint 49 is automatically slid in the opening direction along the slide groove 41 under the force from the helical spring 48.

Because the bifurcated engagement slide connection member 66 is connected to the first casing member 21, the sliding movement of the bifurcated engagement slide connection member 66 causes the first casing member 21 to slide also in the opening direction. Upon the sliding movement of the first casing member 21, the slide connection member 67 also slides in the opening direction along the slide groove 42.

Further sliding movement of the first casing member 21 in the opening direction brings the bifurcated engagement slide connection member 66 and the slide connection member 67 into abutment against the respective ends 41a, 42a of the slide grooves 41, 42 of the second casing member 22, as shown in FIG. 12. The sliding movement of the first casing member 21 in the opening direction is stopped, whereupon the cellular phone reaches the open position in which substantially one-half of the first casing member 21 projects from the second casing member 22, exposing the lower casing control pad 15 as shown in FIG. 12.

[Rotation of the Bifurcated Joint]

As described above with reference to FIG. 9, the cellular phone according to the present embodiment has the casing members 21, 22 gradually curved in their entirety so as to be concave upwardly (toward the display panel 3). Inasmuch as the slide grooves 41, 42 are also curved, therefore, the bifurcated engagement slide connection member 66 and also the slide connection member 67 slide along the curved slide grooves 41, 42, as shown in FIG. 10.

The guide shaft 60 which is in the form of a straight rod is mounted on the curved second casing member 22 by the tapered rail support 87 as shown in FIG. 10.

Therefore, whereas the bifurcated engagement slide connection member 66 slides along the curved slide groove 41, the bifurcated joint 49 of the guide shaft 60 moves straight. Since the bifurcated engagement slide connection member 66 and the bifurcated joint 49 thus move along different paths, the bifurcated joint 49 of the guide shaft 60 which is connected to the bifurcated engagement slide connection member 66 might be broken.

With the cellular phone according to the present embodiment, however, as the bifurcated engagement slide connection member 66 is slid along the slide groove 41, the bifurcated joint 49 turns about the axis of the guide shaft 60, thereby taking up the difference between the paths along which the bifurcated engagement slide connection member 66 and the bifurcated joint 49 move.

Figure 13:
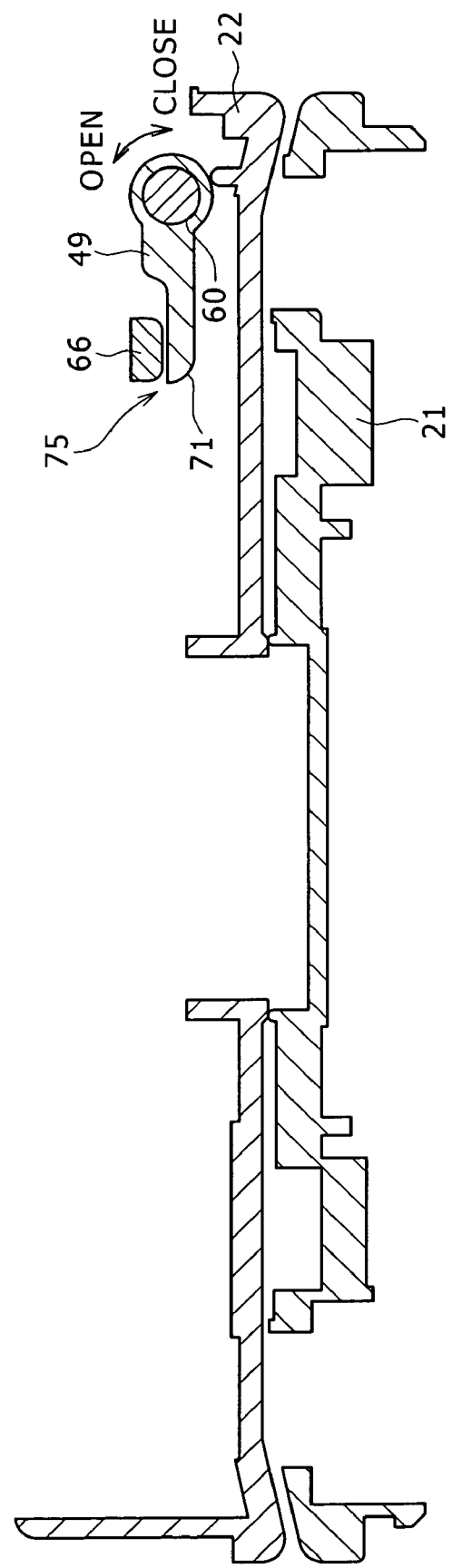
FIG. 13 is an enlarged transverse cross-sectional view showing the manner in which the bifurcated joint of the guide shaft and the bifurcated joint slide connection member operate when the cellular phone is closed.

FIG. 13 shows in enlarged transverse cross section the manner in which the bifurcated joint 49 of the guide shaft 60 and the bifurcated engagement slide connection member 66 operate when the cellular phone is closed, and FIG. 14 shows in enlarged transverse cross section the manner in which the bifurcated joint 49 of the guide shaft 60 and the bifurcated engagement slide connection member 66 operate when the cellular phone is open.

When the cellular phone is closed, as shown in FIG. 11, the bifurcated joint 49 is positioned in a substantially intermediate location along the full length of the second casing member 22. This indicates that the bifurcated joint 49 is positioned substantially at the vertex of the curve of the second casing member 22. Since the vertex of the curve of the second casing member 22 may be regarded as a starting point of the curve of the second casing member 22, the bifurcated joint 49 is positioned in a flat region. When the cellular phone is closed, therefore, the insertion pin 71 inserted in the pin insert 75 of the bifurcated engagement slide connection member 66 and the riding pin 72 riding on the mount ledge 76 of the bifurcated engagement slide connection member 66 lie horizontally parallel to the second casing member 22, as shown in FIG. 13.

When the cellular phone gradually changes from the closed position to the open position, i.e., when the first casing member 21 is gradually moved away from the second casing member 22, the bifurcated engagement slide connection member 66 slides along the curved second slide groove 41 of the second casing member 22, and the bifurcated joint 49 connected to the bifurcated engagement slide connection member 66 moves straight along the guide shaft 60 away from the bifurcated engagement slide connection member 66 sliding along the curved second slide groove 41.

As the bifurcated engagement slide connection member 66 slides along the curved second slide groove 41, the bifurcated engagement slide connection member 66 pushes the bifurcated joint 49 toward the second casing member 22. The bifurcated joint 49 is thus caused to turn in an opening direction shown in FIG. 14.

Conversely, when the cellular phone gradually changes from the open position to the closed position, i.e., when the first casing member 21 is gradually moved toward the second casing member 22, the riding pin 72 (see FIG. 7) of the bifurcated joint 49 is gradually pushed away from the second casing member 22 by the mount ledge 76 (see FIGS. 6A to 6C) of the bifurcated engagement slide connection member 66. The bifurcated joint 49 is thus caused to turn in a closing direction shown in FIG. 13.

As described above, when the bifurcated engagement slide connection member 66 slides along the curved slide groove 41 and the bifurcated joint 49 of the guide shaft 60 moves straight, the bifurcated joint 49 turns about the axis of the guide shaft 60, taking up the difference between the paths along which the bifurcated engagement slide connection member 66 and the bifurcated joint 49 move. Consequently, the bifurcated joint 49 connected to the bifurcated engagement slide connection member 66 is prevented from being broken when the cellular phone changes between the open position and the closed position.

[Reduction of the Sliding Speed]

The cellular phone according to the present invention can automatically be opened under the bias of the helical spring 48 of the guide shaft 60. When the cellular phone is opened, the force produced by the helical spring 48 and applied in the opening direction is somewhat reduced and transmitted to the upper casing 1.

Specifically, when the cellular phone is closed, as shown in FIG. 11, the helical spring 48 of the guide shaft 60 is compressed by the bifurcated joint 49. When the cellular phone changes from the closed position to the open position, the force produced by the helical spring 48 as it extends is transmitted through the bifurcated joint 49 and the bifurcated engagement slide connection member 66 to the first casing member 21, forcing the first casing member 21 to slide in the opening direction.

When the first casing member 21 thus slides, the pinion 61 (see FIG. 3) held in mesh with the rack 62 on the first casing member 21 shown in FIG. 4 rotates. At this time, the pinion 61 rotates in abutment against the rotational speed reducer 63 disposed in the pinion placement unit.

Therefore, the rotational speed of the pinion 61 is reduced by the rotational speed reducer 63 due to its frictional abutting engagement with the pinion 61. The force produced by the helical spring 48 as it extends is thus reduced and transmitted to the first casing member 21. The upper casing 1 and the lower casing 2 are slid against each other at a moderate speed to automatically open the cellular phone.

[Advantages of the Embodiment]

As described above, in the cellular phone according to the present embodiment, the first casing member 21 is connected to the second casing member 22 by the slide connection members 51, 52, and the second casing member 22 is connected to the first casing member 21 by the bifurcated engagement slide connection member 66 and the slide connection member 67. Stated otherwise, the first casing member 21 and the second casing member 22 are connected to each other by two pairs of slide shaft structures. Therefore, the first casing member 21 and the second casing member 22 are firmly connected to each other while they are being slidable against each other.

As shown in FIG. 3, the slide grooves 31, 32 are defined in the substantially lower half region of the first casing member 21, and the slide grooves 41, 42 are defined in the substantially upper half region of the second casing member 22 in symmetrical relation to the slide grooves 31, 32. The upper casing 1 is slidable in a direction to expose the lower casing control pad 15 on the lower casing 2. When the cellular phone is open, the slide grooves 31, 32 defined in the first casing member 21 are concealed from external view by the substantially upper half region of the second casing member 22. Therefore, irrespective of whether the cellular phone is open or closed or anywhere between the open and closed positions, the slide grooves 31, 32, 41, 42 are concealed from external view.

The cellular phone according to the present embodiment has the casing members 21, 22 gradually curved in their entirety so as to be concave upwardly (toward the display panel 3). When the cellular phone is opened, accordingly, the display panel 3 on the upper casing 1 is pushed slightly to the front along the curved shape to allow the user to see the display panel 3 with better visibility.

The rail support 87 of the guide shaft placement member 79 on which the straight rod-shaped guide shaft 60 is placed is tapered to make up for the space between the straight rod-shaped guide shaft 60 and the curved second casing member 22 at the time the straight rod-shaped guide shaft 60 is placed on the curved second casing member 22. Therefore, the straight rod-shaped guide shaft 60 is stably placed in position on the gradually curved second casing member 22.

The bifurcated joint 49 of the guide shaft 60 is rotatable about the axis of the guide shaft 60. When the bifurcated engagement slide connection member 66 slides along the curved slide groove 41 and the bifurcated joint 49 of the guide shaft 60 moves straight, the bifurcated joint 49 turns about the axis of the guide shaft 60, taking up the difference between the paths along which the bifurcated engagement slide connection member 66 and the bifurcated joint 49 move. Consequently, the bifurcated joint 49 connected to the bifurcated engagement slide connection member 66 is prevented from being broken when the cellular phone changes between the open position and the closed position.

When the cellular phone is mainly opened, the rotational speed of the pinion 61 is reduced by the rotational speed reducer 63. The force produced by the helical spring 48 as it extends is thus reduced and transmitted to the first casing member 21. The upper casing 1 and the lower casing 2 are slid against each other at a moderate speed to automatically open the cellular phone.

[Modifications]

In the illustrated embodiment, the casing members 21, 22 are gradually curved in their entirety so as to be concave upwardly (toward the display panel 3). Therefore, the rail support 87 of the guide shaft placement member 79 on which the guide shaft 60 is placed is tapered, and the bifurcated joint 49 of the guide shaft 60 is rotatable to take up the difference between the paths along which the bifurcated engagement slide connection member 66 and the bifurcated joint 49 move. However, the casing members 21, 22 may be straight in shape.

With the casing members 21, 22 being straight, since the bifurcated engagement slide connection member 66 moves straight, the rail support 87 does not need to be tapered and may be straight in the longitudinal direction of the second casing member 22, and the rotatable structure of the bifurcated joint 49 may be omitted.

The present invention is applied to the cellular phone in the illustrated embodiment. However, the principles of the present invention are also applicable to any of various other slide-type terminal devices including a PHS (Personal Handyphone System) phone, a PDA (Personal Digital Assistant) unit, an electronic dictionary unit, etc.

Although a certain preferred embodiment of the present invention has been shown and described in detail, it should be understood that various changes and modifications may be made therein without departing from the scope of the appended claims.

What is claimed is:

1. A portable terminal device, comprising:
   an upper casing configured to be a front face of the portable terminal device;
   a lower casing positioned substantially behind the upper casing;
   a pair of slide grooves defined in a substantially lower half region of said upper casing closely to respective opposite side faces of said upper casing and extending in a longitudinal direction of said upper casing;
   a pair of slide grooves defined in a substantially upper half region of said lower casing closely to respective opposite side faces of said lower casing and extending in a longitudinal direction of said lower casing;
   a pair of joint holes which are defined in said upper casing near respective lower ends of said slide grooves defined in said lower casing and visible through said slide grooves defined in said lower casing when respective confronting faces of said upper casing and said lower casing are superposed on each other;
   a pair of joint holes which are defined in said lower casing near respective upper ends of said slide grooves defined in said upper casing and visible through said slide grooves defined in said upper casing when the respective confronting faces of said upper casing and said lower casing are superposed on each other;
   a pair of upper casing slide connection members slidably engaging in the slide grooves defined in said upper casing;
   a pair of lower casing slide connection members slidably engaging in the slide grooves defined in said lower casing;
   a guide shaft mounted to said lower casing, the guide shaft including a rod-shaped shaft body, and a spring and a joint which are fitted over said rod-shaped shaft body, said joint being configured to rotate around a longitudinal axis of the guide shaft as said spring is extended and contracted; and
   an engagement member included on at least one of said lower casing slide connection members, and the engagement member is configured to be joined to the joint of said guide shaft while the joint of said guide shaft rotates around the longitudinal axis of the guide shaft when the spring is extended and contracted,
   wherein said upper casing and said lower casing are slidably connected to each other by securing said upper casing slide connection members slidably engaging in the slide grooves defined in said upper casing, in said joint holes in said lower casing, and by securing said lower casing slide connection members slidably engaging in the slide grooves defined in said lower casing, in said joint holes in said upper casing, with the respective confronting faces of said upper casing and said lower casing being superposed on each other.

2. The portable terminal device according to claim 1, wherein:
   said upper casing is of a shape curved so as to concave toward a surface thereof which is opposite to the confronting surface thereof facing said lower casing;
   said lower casing is of a shape curved so as to be concave toward the confronting surface thereof facing said upper casing;
   said rod-shaped shaft body of said guide shaft over which the spring is mounted is straight such that the joint moves in a straight line when the spring is extended and contracted; and
   when said lower casing slide connection members move along the shape of said lower casing, said joint of said guide shaft rotates about the longitudinal axis of said guide shaft to take up a difference between a curved path along which said engagement member moves and a straight path along which said joint of said guide shaft moves.

3. The portable terminal device according to claim 1, further comprising:
   a sliding force reducing section for reducing a sliding force applied to said upper casing through said joint of said guide shaft and the engagement member of said one of said lower casing slide connection members when said spring of the guide shaft is extended and contracted.

4. The portable terminal device according to claim 3, wherein said sliding force reducing section comprises:
   a rack mounted on said upper casing and extending in a longitudinal direction of said upper casing;
   a pinion rotatably mounted on said lower casing and held in mesh with said rack; and
   a rotational speed reducer held in abutment against said pinion at all times.

5. The portable terminal device according to claim 1, wherein
   when the respective confronting faces of the upper casing and the lower casing are superposed on each other, the portable terminal device is in a closed position, and
   when the portable terminal device is in the closed position, the pair of slide grooves in the upper casing is positioned entirely below the pair of slide grooves in the lower casing.

6. The portable terminal device according to claim 1, further comprising:
   a display panel positioned on the upper casing.

7. The portable terminal device according to claim 1, wherein the spring is coaxial with the rod-shaped shaft body.

8. The portable terminal device according to claim 1, wherein the guide shaft is mounted to said lower casing via a guide shaft placement member attached to the lower casing.

9. The portable terminal device according to claim 1, wherein the joint includes a first pin and a second pin, and the engagement member is configured to be positioned between the first pin and the second pin to join the engagement member to the joint of said guide shaft while the joint rotates around the longitudinal axis of the guide shaft when the spring is extended and contracted.

10. A portable terminal device, comprising:
    an upper casing configured to be a front face of the portable terminal device;
    a lower casing positioned substantially behind the upper casing;

a pair of slide grooves positioned in a substantially lower half region of the upper casing and extending in a longitudinal direction of the upper casing;

a pair of slide grooves positioned in a substantially upper half region of the lower casing and extending in a longitudinal direction of the lower casing;

a pair of joint holes positioned in the upper casing near respective lower ends of the pair of slide grooves in the lower casing when respective confronting faces of the upper casing and the lower casing are superposed on each other;

a pair of joint holes positioned in the lower casing near respective upper ends of the pair of slide grooves in the upper casing when the respective confronting faces of the upper casing and the lower casing are superposed on each other;

a pair of upper casing slide connection members slidably engaged with the joint holes in the lower casing through the slide grooves in the upper casing;

a pair of lower casing slide connection members slidably engaged with the joint holes in the upper casing through the slide grooves defined in the lower casing;

a guide shaft mounted to the lower casing, the guide shaft including a rod-shaped shaft body, and a spring and a joint which are fitted over the rod-shaped shaft body, the joint being configured to rotate around a longitudinal axis of the guide shaft as the spring is extended and contracted; and an engagement member included on at least one of the lower casing slide connection members, and the engagement member is configured to be joined to the joint of the guide shaft while the joint of the guide shaft rotates around the longitudinal axis of the guide shaft when the spring is extended and contracted.

11. The portable terminal device according to claim 10, wherein:

the upper casing has a concave shape so as to curve toward a surface thereof which is opposite to the confronting surface thereof facing the lower casing;

the lower casing has a concave shape so as to curve toward the confronting surface thereof facing the upper casing;

the rod-shaped shaft body of the guide shaft over which the spring is mounted is straight such that the joint moves in a straight line when the spring is extended and contracted; and when the lower casing slide connection members move along the shape of the lower casing, the joint of the guide shaft rotates about the longitudinal axis of the guide shaft to take up a difference between a curved path along which the engagement member moves and a straight path along which the joint of the guide shaft moves.

12. The portable terminal device according to claim 10, further comprising:

a sliding force reducing section configured to reduce a sliding force applied to the upper casing through the joint of the guide shaft and the engagement member of the one of the lower casing slide connection members when the spring of the guide shaft is extended and contracted.

13. The portable terminal device according to claim 12, wherein the sliding force reducing section comprises:

a rack mounted on the upper casing and extending in a longitudinal direction of the upper casing;

a pinion rotatably mounted on the lower casing and held in mesh with the rack; and a rotational speed reducer held in abutment against the pinion at all times.

14. The portable terminal device according to claim 10, wherein when the respective confronting faces of the upper casing and the lower casing are superposed on each other, the portable terminal device is in a closed position, and when the portable terminal device is in the closed position, the pair of slide grooves in the upper casing is positioned entirely below the pair of slide grooves in the lower casing.

15. The portable terminal device according to claim 10, further comprising:

a display panel positioned on the upper casing.

16. The portable terminal device according to claim 10, wherein the spring is coaxial with the rod-shaped shaft body.

17. The portable terminal device according to claim 10, wherein the guide shaft is mounted to the lower casing via a guide shaft placement member attached to the lower casing.

18. The portable terminal device according to claim 10, wherein the joint includes a first pin and a second pin, and the engagement member is configured to be positioned between the first pin and the second pin to join the engagement member to the joint of the guide shaft while the joint rotates around the longitudinal axis of the guide shaft when the spring is extended and contracted.

* * * * *